No. 735,146. PATENTED AUG. 4, 1903.
T. POWELL.
THRESHER.
APPLICATION FILED SEPT. 3, 1902.
NO MODEL.
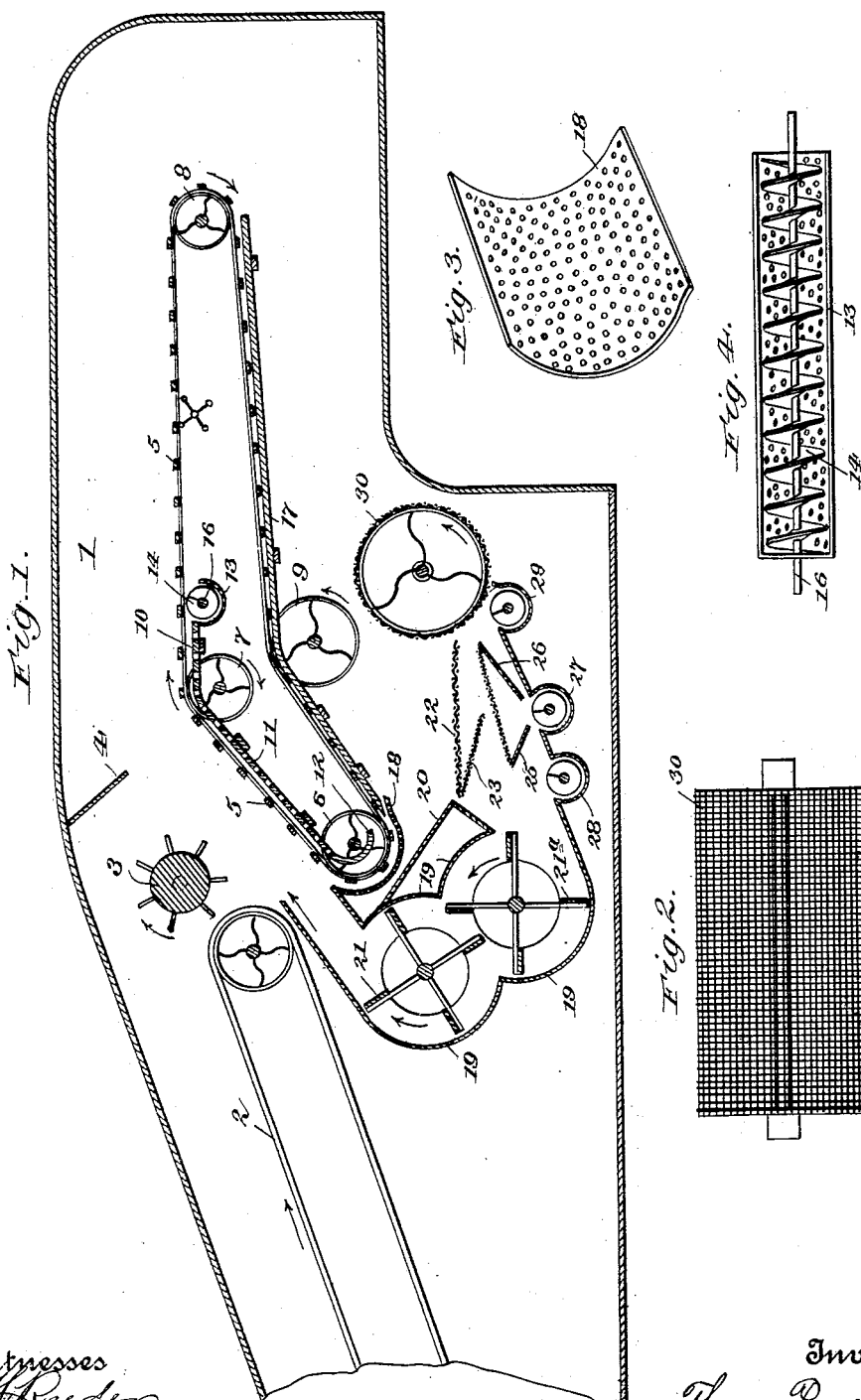

No. 735,146. Patented August 4, 1903.

UNITED STATES PATENT OFFICE.

THOMAS POWELL, OF NEWHOPE, CALIFORNIA.

THRESHER.

SPECIFICATION forming part of Letters Patent No. 735,146, dated August 4, 1903.

Application filed September 3, 1902. Serial No. 121,960. (No model.)

*To all whom it may concern:*

Be it known that I, THOMAS POWELL, a citizen of the United States, residing at Newhope, in the county of San Joaquin, State of California, have invented certain new and useful Improvements in Threshers; and I do declare the following to be a full, clear, and exact description of the invention, such as will enable others skilled in the art to which it appertains to make and use the same, reference being had to the accompanying drawings, and to the figures marked thereon, which form a part of this specification.

My invention relates to threshers, either stationary or of that class known as "combined harvesters," which consist of threshers with a header attached for cutting the standing grain.

My object is to furnish a machine wherein the kernels of the grain may be separated from the straw, weeds, chaff, and other extraneous material after passing through the cylinder and over and beyond the straw-carrier and to such an extent that only really cleaned grain falls upon the shoe for further action.

Also it is my object to produce a machine which is formed by such a combination and certain arrangement of parts as will in effect dispense with the usual auxiliary grain-cleaning apparatus employed with such class of machines.

These objects are mainly accomplished, first, by the use of a picker arranged between the rear end of the grain-draper and a deflector attached to the ceiling of the thresher-trunk; second, by the use of a straw-carrier traversing about a series of suitably-constructed floors with perforations at certain locations in said floors; third, by the use of double fans located so as to rotate at opposites and operate upon the threshed grain at the most desirable points of contact; fourth, by the use of a double shoe of novel construction; fifth, by the use of a rotating perforated cylinder at the rear of such shoe; sixth, by such other devices as will be shown herein and pointed out in the claims hereunto annexed, reference being had to the accompanying drawings for a better comprehension thereof, in which—

Figure 1 is a side sectional elevation of a thresher-trunk, showing on its inside all the requisite parts except the usual spiked cylinder, including those embodying my improvements. Fig. 2 is a detached enlarged view of a revolving perforated cylinder. Fig. 3 is a detached enlarged view of a perforated shield. Fig. 4 is a detached view of a perforated trough containing an auger-carrier.

Similar figures of reference indicate corresponding parts in the several views.

The trunk 1 of my improved thresher is of ordinary construction and is shown without the spiked cylinder, bearing-wheels, or supporting-sills. The front end is provided with the usual grain-carrier 2 for conveying the threshed grain from the cylinder. At the exit of and slightly above the grain-carrier 2 is located a rapidly-turning picker 3, which separates the straw from the threshed grain to a marked degree and throws the straw against a deflector 4, which is attached to the ceiling of the trunk 1 and preferably inclines rearwardly. A straw-carrier 5, having front ends depressed, is distended and rotated by pulleys 6, 7, 8, and 9, located at suitable points of action, and is provided beneath its front or depressed end with a parallel floor 11, having a front or curved end 12 following the periphery of the carrier, and is supplied with suitable perforations for the purpose, as will be shown, and is further provided with a horizontal extension 10 at its rear, which permits of certain portions of material being operated upon by the straw-carrier 5, to be deposited in a half-circular trough 13, provided with suitable perforations and containing an auger-carrier 14.

Beneath the carrier 5 and parallel therewith is located a floor 17, having its front portion depressed in the same ratio as the inclination of that portion of the carrier 5. Directly in front of the inclined end of the carrier 5 is located a perforated shield 18, preferably of metal, which permits of the kernels of grain escaping upon the usual grain-board 20 and sliding down the inclined face thereof to fall upon a shoe 22 and through a sieve thereof of meshes of proper dimensions upon an inclined wire screen 23, the meshes of which permit the passage of air, but are too small to pass the grain-kernels, and from that upon a slightly forwardly inclined sieve 24, which discharges the kernels of cleaned grain into a trough 28, from which it is discharged into the usual elevator or sacker and admits the cheat through its meshes upon inclined wire-screen slides 25 and 26 at opposites, which discharge the cheat into a trough 27 and the chaff, &c., into a trough 29. A fan-mill box 19 contains oppositely-moving fans, the upper or overblast set 21 for action upon the threshed grain as it leaves the picker 3 and is thrown upon the carrier 5 and the lower or underblast set 21$^a$ for action upon the grain as it falls from the grain-board 20. At the rear of the shoe 22 and series of sieves above described is located a revolving perforated cylinder of suitable material for the purposes as will be shown.

The mode of operating my improved thresher is as follows: The threshed straw when being elevated by the grain-carrier is caught at the delivery end of the carrier by the rapidly-revolving picker 3 and thrown against the inclined deflector 4 and then drops to the straw-carrier 5, and in its flight it is so agitated that the grain and chaff contained therein are released and fall toward the front end of the straw-carrier and in its fall is caught by the blast from the upper fan 21, and any chaff or straw which it may contain is separated and blown toward the rear of the straw-carrier, the grain falling upon the shield 18 at the front end of the carrier and through its perforations upon the grain-board 20 and down its face to the shoe 22, where it is caught by the blast from the lower fan 21$^a$ and given an extra cleaning. Any weeds or straw falling with the grain from the picker 3 to the carrier 5 and which are too heavy to be carried away by the blast are dragged by the slats of the carrier 5 on the floor 11 to the auger 14 16 at the rear of the platform 11 and dropped therein and conveyed by the auger to the outside of the machine. The trough 13 of such auger being perforated allows any kernels of grain to drop from the trough separated from the straw, stems, and weeds. Such kernels of grain fall to the lower platform 17 and are carried forward by the slats of the carrier and drop through the perforated shield 18 and fall upon the grain-board 20 to the shoe. By the usual agitation of the straw-carrier 5 the straw falls more or less through the upper side of the carrier 5 and is carried by the lower side to the front end and often accumulates sufficient to fill the carrier and stop the machinery by clogging. In such case my invention provides for taking the straw out of the carrier at the same ratio it falls in, since when it is being carried forward by the lower part of the carrier 5 it is caught by the carrier-slats and pressed against the curved end 12 of the floor 11 and is delivered into the trough 13 and is conveyed out of the machine by the auger 14 16.

The pulley 9, one on each side of the trunk, holds up the straw-carrier. The cylinder 30 is composed of wire-cloth having fine meshes and performs the functions of an ordinary tail-board and permits also of the blast from the fan 21$^a$ passing through it, but obstructs and prevents any grain-kernels from being blown over and lost, as when such kernels strike the cylinder they will fall to the shoe 22 and be saved, while the chaff which strikes the cylinder will be held fast to the screen-face by the wind and released when the cylinder turns sufficient for it to drop outside of the shoe.

It will thus be seen that by the use of my devices the grain when it reaches the shoe or cleaner portion is divested of nearly all extraneous matter, the process of separation having been mainly accomplished before that point of operation on the grain is reached.

In illustrating my invention I have dispensed with the showing of the manner of propelling the parts, and many of them I have not shown, as they are all well known and readily understood.

What I claim as new, and desire to secure by Letters Patent, is—

1. In a thresher, the combination of a trunk, pulleys mounted therein, an endless straw-carrier mounted on said pulleys, and having slats arranged at a suitable distance apart, a board arranged below the upper stretch of said carrier, and having a curved end at the front portion of the carrier, and a conveyer arranged between the stretches of the carrier to receive material from the rear end of the said board, and work it out of the thresher.

2. In a thresher, the combination of a trunk, a grain-draper, a deflector arranged in rear of the grain-draper, a picker arranged between the grain-draper and the deflector for catching straw from the former and throwing it against the latter, pulleys mounted in the trunk, an endless straw-carrier mounted on said pulleys, and having slats arranged at a suitable distance apart; said straw-carrier being arranged below the deflector and the picker so that an open space is afforded between said carrier and the deflector, a blower arranged to send a blast of air through said space, a perforated board arranged below the upper stretch of said carrier, and having a curved end at the front portion of the carrier, means arranged below the perforated board and the straw-carrier for cleaning the grain, and a conveyer arranged between the stretches of the carrier to receive material from the rear end of the perforated board, and work it out of the thresher.

3. In a thresher, the combination of a trunk, pulleys mounted therein, an endless straw-carrier mounted on said pulleys, a board arranged below the forward portion of the upper stretch of said carrier, and a conveyer arranged between the stretches of the carrier to receive material from the rear end of said board, and work it out of the thresher.

4. In a threshing-machine, the combination of a trunk, a straw-carrier, means for supplying straw to the forward portion of said carrier, a perforated shield located adjacent to the front portion of the straw-carrier, a blower arranged below said shield, means for receiving and cleaning the grain that drops through the shield, and means for removing the product of threshing from the trunk.

5. In a threshing-machine, the combination of a trunk, a straw-carrier, means for supplying straw to the forward portion of said carrier, a perforated shield located adjacent to the front portion of the straw-carrier, a grain-board arranged to receive grain from the perforated shield, a double shoe arranged to receive grain from the board, means for receiving grain, cheat and chaff, respectively, and working the same out of the trunk, and a blower arranged to send a blast of air against the shoe.

6. A threshing-machine substantially as described comprising the trunk, a suitable grain-draper, and straw-carrier, the perforated shield 18 located at the front of the straw-carrier and a suitable shoe and fan-mill and means for removing the product of threshing from the trunk.

7. In a thresher a suitable means for conveying the grain from the cylinder to the straw-carrier 5, a floor parallel with and beneath the upper part of the straw-carrier, the perforated trough 13 located at the rear of the floor and containing an auger-conveyer, a suitable shoe and fan-mill all arranged and operating substantially as described.

8. The combination within the trunk of a thresher of a grain-draper 2, a picker 3 at its rear, a deflector 4 at the rear of the picker, the straw-carrier 5, the parallel perforated upper floor 10 11 12, the parallel lower floor 17, the perforated shield 18 and a suitable fan-mill and shoe all arranged and operated substantially as shown and described.

9. In a thresher the overblast fan 21 and the underblast fan 21ᵃ located within a suitable chamber 19 in combination with the straw-carrier 5, the perforated shield 18, a suitable shoe, conveyers, pulleys and grain-draper all arranged and operating substantially as shown and described.

10. In a thresher, the combination of a trunk, a grain-draper, a deflector arranged in rear of the grain-draper, a picker arranged between the grain-draper and the deflector for catching straw from the former and throwing it against the latter, a straw-carrier arranged below the deflector and the picker so that an open space is afforded between said straw-carrier and the deflector and picker; said straw-carrier being endless and mounted on pulleys, a board arranged below the upper stretch of the forward portion of the straw-carrier, means for receiving straw from the rear end of said board, and conveying it out of the thresher, a perforated shield located adjacent to the front portion of the straw-carrier, a grain-board arranged to receive from the perforated shield, grain-cleaning devices arranged to receive from the grain-board, a rotary, perforated cylinder arranged below the straw-carrier, and in rear of the grain-cleaning devices, a blower arranged to send a blast of air through the space between the straw-carrier and the deflector and picker, and a second blower arranged to send a blast through the grain-cleaning devices and the rotary cylinder.

11. The combination in a threshing-machine of an endless straw-carrier, means for supplying straw to the upper stretch of said carrier, a perforated board arranged below said upper stretch of the carrier, a trough arranged to receive from said board, and having perforations for the passage of grain-kernels, a conveyer movable in the trough for carrying material along the same, and grain-cleaning means located below the straw-carrier and the perforated board.

12. In a threshing-machine, the combination of an endless straw-carrier, means for supplying straw to the forward portion of the upper stretch of said carrier, a perforated board arranged below said portion of the upper stretch of the carrier, and having a curved forward end arranged at the forward portion of the carrier, a trough arranged to receive from the rear end of the perforated board, and having perforations, a conveyer in said trough, and grain-cleaning means located below the straw-carrier and the perforated board.

13. In a threshing-machine, the combination of an endless straw-carrier, means for supplying straw to the forward portion of the upper stretch of said carrier, a perforated board arranged below said portion of the upper stretch of the carrier, and having a curved forward end arranged at the forward portion of the carrier, a trough arranged to receive from the rear end of the perforated board and having perforations, a conveyer in said trough, a perforated shield arranged adjacent to the forward portion of the straw-carrier, a grain-shoe, a blower for sending a blast of air through said shoe, and a board for receiving grain from the perforated shield, and conducting it to the shoe.

14. The combination in a thresher substantially as shown and described of a grain-carrier, straw-carrier, a perforated shield at the front of the straw-carrier the inclined grain-board 20, a suitable shoe, the revolving perforated cylinder 30, the double-fan mill 21 and 21ª and suitable means, for conveying the product of separation from the machine, located beneath the shoe at the rear end of the perforated floor 10 11 12.

15. In a thresher suitable means for conveying the threshed grain from the cylinder to a suitable straw-carrier located upon and operated by a series of pulleys, the bottom floor 17 parallel with and following the periphery of the straw-carrier, the perforated shield 18 and a suitable shoe and fan-mill all arranged and operating substantially as and for the purposes described and set forth.

In testimony whereof I affix my signature in presence of two witnesses.

THOMAS POWELL.

Witnesses:
JOSHUA B. WEBSTER,
CORA SPERRY.